H. C. BRINKERHOFF.
ANTIRATTLING DEVICE FOR AUTOMOBILES.
APPLICATION FILED APR. 12, 1921.
1,420,077. Patented June 20, 1922.
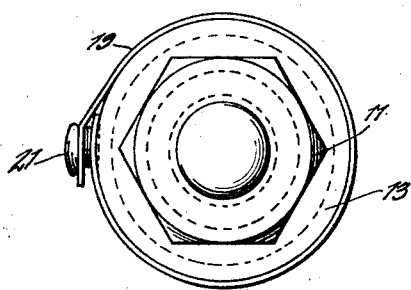
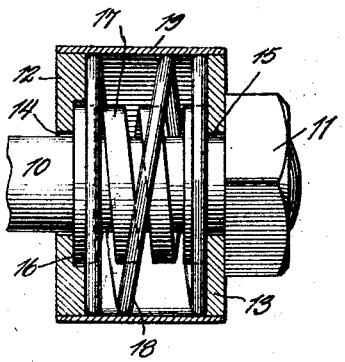
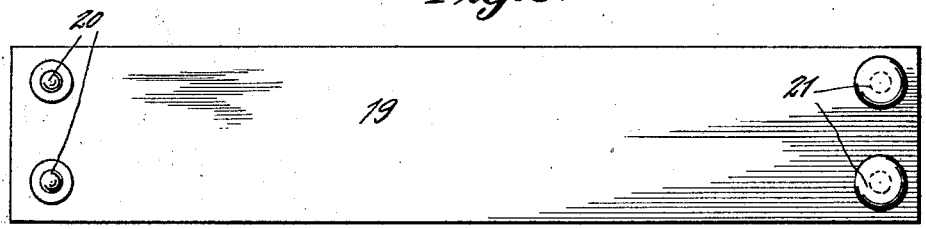
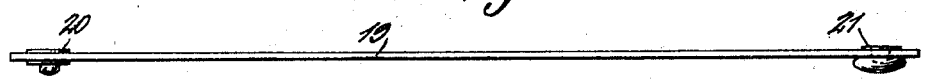
Inventor
Howard C. Brinkerhoff
By J. Cam Kelly, Attorney

UNITED STATES PATENT OFFICE.

HOWARD C. BRINKERHOFF, OF ALLSTON, MASSACHUSETTS.

ANTIRATTLING DEVICE FOR AUTOMOBILES.

1,420,077.  Specification of Letters Patent.  Patented June 20, 1922.

Application filed April 12, 1921. Serial No. 460,859.

*To all whom it may concern:*

Be it known that I, HOWARD C. BRINKERHOFF, citizen of the United States, residing at Allston, in the county of Suffolk and State of Massachusetts, have invented certain new and useful Improvements in Antirattling Devices for Automobiles, of which the following is a specification.

This invention relates to improvements in an anti-rattling device for automobiles and the main object is to eliminate the rattle caused particularly by spring bolts and shackles.

A further object of the invention is to provide a small, simple device of the above character which may be used for anti-rattling purposes on different makes of automobiles and in connection with different parts of the mechanism.

A still further object of the invention is to provide anti-rattling device that is simple in construction, strong and durable and which may be manufactured at a minimum cost.

Another object of the invention is to provide an anti-rattling device that includes independent springs arranged one within the other and an outer flexible container detachably associated therewith so as to maintain the springs free from dust and dirt and in addition to form a container for lubricating purposes, substantially as shown in the drawing.

Various other objects and advantages of my invention will become apparent during the continuance of the following description.

In the drawings:—

Figure 1 is a view in front elevation showing my invention as in its preferred embodiment and as associated with a bolt of an automobile.

Figure 2 is a view in cross section of the container and washer parts of my invention showing the bolts and the springs in elevation.

Figure 3 is a view in top plan of the flexible container.

Figure 4 is an edge view of the flexible container.

For the purpose of illustration, I have shown in the drawings a bolt 10 of conventional form in connection with which my invention is associated. However it is to be understood that this is merely selected for purposes of illustration and the application of my invention is in no way limited to the same. The bolt is of course provided at one end with the usual nut 11. The device of my invention consists more specifically in spaced washer members 12 and 13 which are provided with openings 14 and 15 for the reception of the shank of the bolt. One washer designated by the numeral 12 is provided adjacent the opening 14 with an annular recess or channel way 16.

An expansion or thrust spring 17 is arranged about the shank of the bolt and one end bears against the washer 13 while the other ends in the circular channel or recess 16 of the washer 12. Another lighter spring 18 is also provided which is of greater diameter than the spring 17, one end thereof bears against the washer 13 while the other end bears against the washer 12 as is shown in Figure 2. After the parts have been arranged in the above manner and a sufficient quantity of grease or other lubricating material is applied about and between the springs, the retainer 19 may be associated therewith in order to exclude dust and dirt from the springs and at the same time maintain the lubricating material thereabout.

The container 19 consists of an elongated strip of flexible material, preferably leather being provided at one end with male snap members 20 and at its other end with female snap members 21. Thus when it is arranged about the device as shown in Figures 1 and 2, the snap members 20 and 21 may be fastened together so as to maintain the container against dislodgment.

From the foregoing it is believed that the advantages and novel features of my invention will be readily understood and therefore further detailed description is deemed unnecessary.

What is claimed is:—

1. An anti-rattling device comprising spaced washer members provided with aligned openings, one of said washer members provided with an annular recess adjacent the opening therein, a coil spring, one end of said coil spring bearing against one of said washers and the other end of said coil spring seating in said annular recess of the other of said washers, a second coil spring interposed between said washers and encircling said first named coil spring, and a flexible container arranged about said washers and said springs, substantially described.

2. In an anti-rattling device of the character described, spaced washer members having aligned openings therein, coil springs interposed between said washer members one spring encircling the other and a container member arranged about said washer members and said spring substantially described.

3. In a device of the character described, spaced washer members having aligned openings, one of said washer members provided with a circular recess adjacent the opening therein, a coil spring interposed between said washer members one end thereof seating in said circular recess, a second coil spring interposed between said washer members and encircling said first named coil spring, a flexible container member arranged about said washer member and said coil spring, and fastening elements at the end of said container member whereby the ends thereof may be fastened together, substantially described.

In testimony whereof I affix my signature.

HOWARD C. BRINKERHOFF.